March 30, 1943.　　　H. M. THORNTON ET AL　　　2,314,957
METHOD OF MAKING ARTIFICIAL TEETH
Filed April 15, 1941　　　4 Sheets-Sheet 1

INVENTORS
HENRY M. THORNTON
BY AND CHARLES DIETZ
W. G. Sullivan
ATTORNEY

March 30, 1943. H. M. THORNTON ET AL 2,314,957
METHOD OF MAKING ARTIFICIAL TEETH
Filed April 15, 1941 4 Sheets-Sheet 2

INVENTORS
HENRY M. THORNTON
AND CHARLES DIETZ
BY W. G. Sullivan
ATTORNEY

March 30, 1943.  H. M. THORNTON ET AL  2,314,957

METHOD OF MAKING ARTIFICIAL TEETH

Filed April 15, 1941  4 Sheets-Sheet 3

INVENTORS
HENRY M. THORNTON
AND CHARLES DIETZ
BY
W. H. Sullivan
ATTORNEY

March 30, 1943.  H. M. THORNTON ET AL  2,314,957
METHOD OF MAKING ARTIFICIAL TEETH
Filed April 15, 1941  4 Sheets-Sheet 4

INVENTORS
HENRY M. THORNTON
BY AND CHARLES DIETZ
W. H. Sullivan  ATTORNEY

Patented Mar. 30, 1943

2,314,957

UNITED STATES PATENT OFFICE 2,314,957

METHOD OF MAKING ARTIFICIAL TEETH

Henry M. Thornton and Charles Dietz, York, Pa., assignors to The Dentists' Supply Company of New York, New York, N. Y., a corporation of New York Application April 15, 1941, Serial No. 388,664

8 Claims. (Cl. 18—55.1)

This invention relates to artificial teeth, and more particularly to artificial teeth in which the distribution of colors and translucence simulate the appearance of natural teeth which have surface stains, abrasions, sub-surface color distribution, and variations in translucence within the teeth.

Heretofore artificial teeth have been composed in principal part of two materials, one a relatively translucent enamel material, and the other a relatively opaque body material. For the purpose of more closely simulating natural teeth, it is proposed to use novel placements of these two materials and also to employ additional materials of different and contrasting colors and varying degrees of opacity and translucency so disposed in the moulding of the tooth as to achieve natural effects. The materials we employ in this process may be porcelain, glass, resinous materials such as acrylics, styrenes, vinyls, phenolic resins, urea resins, etc., liquid stains, semi-liquid stains, or powdered stains, decalcomania, or other material adaptable to this process and suitable for use in the manufacture of artificial teeth.

A primary object of the present invention is to provide artificial teeth which closely resemble natural teeth.

A further object of the invention is to provide a process for producing artificial teeth which when placed in the mouth will closely resemble adjacent natural teeth, and in the case of entire dentures, will give the appearance of natural teeth.

A still further object of the invention is to provide a process for producing artificial teeth having various color markings or designs of dentine colors to simulate designs in natural teeth.

This invention is an improvement on the invention described and claimed in United States patent to Clapp No. 1,547,643 granted July 28, 1925.

According to the invention, the process comprises the use of a multi-part mould which, in making anterior teeth for example, may consist of the labial surface forming mould member, the lingual surface forming member, and the shader members, which latter may coact with either the labial surface forming member or the lingual surface forming member.

In the aforementioned Clapp patent allowance was made for the use of only two materials, body and enamel, and no provision was incorporated therein whereby the visible irregularities of natural teeth such as gnarled enamel, terminal branches of dentinal tubules, enamel spindles, tufts, enamel lamella, and dentine designs might be accurately reproduced in repeated mouldings.

One method of practicing the invention is to have the shader mould member coact with the labial forming mould member, in which case the enamel or veneer of the tooth is formed first. Each tooth forming portion of the shader member may be considered as a die which forms the enamel facing of an individual tooth. This die may be arcuate on its external surface. This arcuate surface may be provided with one or more depressions or with one or more elevations, or both, at desired areas. In these depressions we may place a body material or enamel material or a material of a different color and composition than the body material or enamel material. The relatively translucent enamel or facing material is then placed in the labial forming mould member and the shader mould member when applied thereto will at one and the same time shape the lingual surface of the enamel material into a generally concave mass increasing in thickness from the gingival to the incisal portion of the tooth and deposit the material which had been previously placed in the depressions of the shader mould member dies at the pre-selected area of the lingual side of said facing. These assembled mould members are pressed, or vibrated and subjected to heat so that when the shader member is removed from the labial forming mould member, the biscuited facing will remain in the labial forming mould member and the material previously placed in the depressions of the shader member will appear in relief united to the lingual side of the facing at the pre-selected areas. Of course, any number of materials different from the body material or enamel material or from each other in translucency, color and composition may be placed in the various depressions in the dies of the shader member.

After the first biscuiting operation body material is applied to the lingual forming mould member and may also be applied to the labial forming mould member sufficient to form the balance of the tooth. These two mould members are then assembled, pressed and heated to form a complete biscuited tooth. The tooth is then permanently vitrified or hardened and the material originally placed in the depressions of the shader member will appear through the relatively translucent enamel on the labial side thereof.

Along with, or in place of depressions, the shader mould member may be provided with elevations on its dies which will thin out pre-selected areas of the enamel or facing material in the labial forming mould member when applied thereto. As previously described, relatively translucent enamel material is applied to the labial forming mould member and the shader member is applied thereto, vibrated or pressed, heated, and the biscuited facings which remain in the labial forming member after the shader member is removed, will contain thinned-out areas corresponding to the designs in relief on the dies of the shader member. To these areas may be applied material the same as the body material or the enamel material, or different from the body material or enamel material in both color and composition.

After the first biscuiting operation body material is applied to the lingual forming mould member and may be applied to the labial forming mould member sufficient to form the balance of the tooth. These two mould members are then assembled, pressed and heated to form a complete biscuited tooth. The tooth is then vitrified in the case of a porcelain tooth, or hardened in the case of a plastic tooth, and the material which was applied to the thinned-out areas of the biscuited facing will be apparent when the finished tooth is viewed on its labial side.

The teeth of older persons, or teeth which have been subjected to extreme incisal abrasion have their incisal enamel tips so worn down that they exhibit a permanent brown or black or yellow stain which appears at the incisal edge or at the lingual surface of the incisal portion of the tooth.

To simulate this appearance in artificial teeth we may provide the shader mould member as described above with a depression extending mesially-distally all the way across the incisal surface of the shader member or, optionally, extending over pre-selected portions of the incisal area of the shader member, or extending gingivally from the incisal area along the mesial and distal sides of the shader member to any desired point, so that effects and designs of incisal discolorations and mesial-distal color effects may be achieved by filling in these depressed areas with suitable coloring material. Or, alternatively, the shader member may be provided in its incisal area with raised portions which produce depressed areas in the lingual side of the enamel veneer, and these depressed areas may be filld in with suitably colored material.

In order to simulate the surface irregularities in the lingual incisal area of natural teeth caused by abrasion, we may employ an elevation or elevations in the incisal area of the above described shader member to shape the lingual incisal portion of the enamel material to the desired contour. To keep these depressions open when the lingual mould member replaces the shader mould member, similar elevations should be provided in the incisal portion of the lingual forming mould member.

Another method of practicing the invention is to have the shader mould member coact with the lingual forming mould member, in which case the body portion of the tooth is formed first. The shader member employed in this process may be considered to consist of dies which have a generally concave arcuate surface in which at desired areas may be provided one or more depressions or one or more elevations or both for forming designs and effecting color placements similar in purpose to those described where the shader member formed the enamel or veneer portion of the tooth first.

In this method body material is placed in the gingival area of the lingual forming mould member and the shader member when applied thereto will shape the labial surface of the body material into a generally convex form in which the incisal extent of the body thus formed terminates some distance from the incisal edge of the tooth, except in those instances where, for the purpose of simulating natural tooth designs, it is desired to have lobes or stripes extend to or near to the incisal edge of the completed tooth, and the shader member at the same time will deposit the material which had previously been placed in the depressions of the shader dies at the pre-selected area of the labial side of said body portion. These assembled mould members are pressed and subjected to heat so that when the shader member is removed from the lingual forming mould member the biscuited body portion will remain in the lingual forming mould member and the material previously placed in the depressions of the shader mould member will appear in relief united to the pre-selected areas of the biscuited body portion.

After this first biscuiting operation relatively translucent enamel or facing material is applied to the labial forming mould member and may be applied to the incisal area of the lingual forming mould member sufficient to form the balance of the tooth. These two mould members are then assembled, pressed and heated to form a complete biscuited tooth. The tooth is then vitrified or hardened and the material originally placed in the depressions of the shader mould member will appear through the relatively translucent enamel on the labial side thereof.

Along with or in place of depressions the shader mould member may be provided with elevations on its dies which will thin out pre-selected areas of the body material in the lingual forming mould member when applied thereto. As previously described, body material is applied to the gingival area of the lingual forming mould member, the shader mould member is applied thereto, the two mould members are pressed together, heated, and the biscuited body portions which remain in the lingual forming mould member when the shader member is removed will contain on their labial side thinned-out areas corresponding with the design in relief on the dies of the shader member. To these areas may be applied material the same as the body material or the enamel material, or different from the body material or the enamel material in color and composition.

After the first biscuiting operation relatively translucent enamel material is applied to the labial forming mould member and may also be applied to the incisal portion of the lingual forming mould member, sufficient to complete the balance of the tooth. These two mould members are then assembled, pressed and heated to form a complete biscuited tooth. The tooth is then vitrified or permanently hardened, and the material which was applied to the thinned-out areas of the biscuited body portion will be visible through the relatively translucent facing when the finished tooth is viewed on its labial side.

To provide stains and discolorations at the lingual incisal area of the tooth similar in purpose to those described where the shader mould member formed the enamel portion first we may apply suitably colored material to the incisal area of the lingual forming mould member after the body portion of the tooth has been formed therein.

In this process we also contemplate that surface irregularities in the lingual incisal area of natural teeth caused by abrasion may be accurately reproduced by employing an elevation or elevations in the incisal area of the lingual forming mould member to shape the lingual incisal portion of the facing material to the desired contour.

The drawings illustrate embodiments of the invention, and the views therein are as follows:

Figure 1 is a top plan view of dies engaged for forming the facing and optionally molding different material thereto, Figure 2 is a fragmentary perspective view showing one of the die members or shaders used for forming the facing and optionally receiving the different material, Figure 3 is a fragmentary perspective view of a facing forming die member adapted to cooperate with the die member of Figure 2, and in which the facing material is placed, Figure 4 is a fragmentary vertical sectional view taken along the line 4—4 of Figure 1, Figure 5 is a vertical sectional view taken along the line 5—5 of Figure 4, Figures 6 to 9 inclusive are fragmentary views showing a variety of designs which may be formed in the die illustrated in Figure 2, Figure 10 is a fragmentary vertical section view showing the mould which deposits and forms the body of the tooth, applied to the bottom mould of Figure 4, Figure 11 is a transverse sectional view on the line 11—11 of Figure 13, Figure 12 is a vertical sectional view on the line 12—12 of Figure 13, Figure 13 is an elevational view of a finished tooth, Figure 14 is a sectional view similar to Figure 4 showing a modification of our invention, Figure 15 is a vertical sectional view showing the die member of Figure 3 applied to the upper die member of Figure 14, Figure 16 is a sectional view generally similar to Figure 10 showing a modified form of tooth, Figure 17 is a view generally similar to Figure 14 but wherein the lower die member is of modified form, Figure 18 is a view generally similar to Figure 15 showing a further modified form of tooth, Figure 19 is a vertical sectional view of a finished tooth formed by employing the die members illustrated in Figure 16, Figure 20 is a plan view of a slightly modified body forming die member, Figure 21 is a section taking along the line 21—21 of Figure 20, Figure 22 is a sectional view generally similar to Figure 14, but wherein the die members are modified, Figure 23 shows a further step in applying the facing material and different material to the tooth body portion of Figure 22, Figure 24 is an enlarged fragmentary section similar to Figure 25, but wherein different material is introduced at the lingual incisal portion of the tooth, Figure 25 is a fragmentary plan view of a modified die member we may employ.

Figure 1:
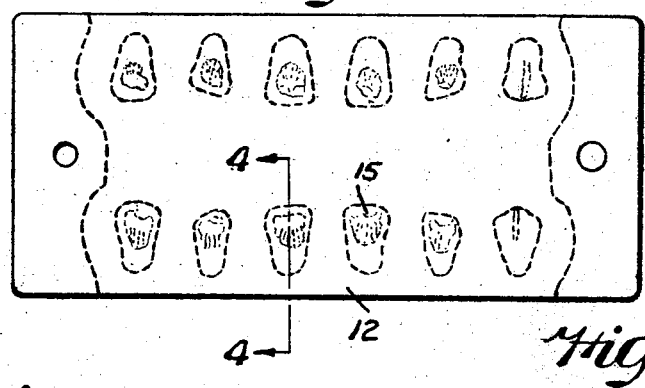
Figure 3:
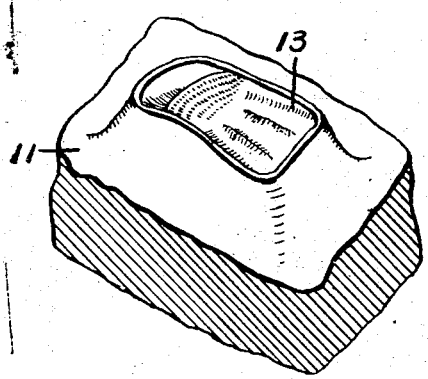
Figure 5:
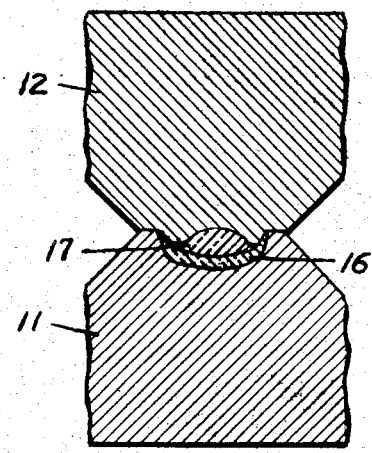

The mould of Figure 1 shows two sets of anterior upper teeth, and represents the combination of a female facing mould part 11 and a male facing mould part 12. The mould part 12 for convenience will be referred to as the "shader." "Shader" as herein used refers to the mould part adapted to form the lingual portion of the facing or the labial portion of the body material as distinguished from the mould parts adapted to form the external surfaces of the tooth. "Facing" as herein used refers to the translucent enamel disposed at the labial side of an artificial tooth and which forms a veneer for the relatively opaque body portion of the tooth. Considering that the mould part 11 has the female forming depressions 13, a quantity of plastic translucent vitreous or resinous forming material is first placed therein, Figure 3 being illustrative of each of the twelve dies of the mould shown in Figure 1. The mould part 12 is provided with a facing forming part 14 having depressions 15 therein. These depressions 15 may be of any desired number and shape, Figures 6 to 9 inclusive showing a variety of designs formed by the depressions. One mode of practicing the invention is to fill the depressions 15 with plastic vitreous forming material or plastic resinous material different in color and/or composition from the facing material by the use of a spatula or the like, and we preferably conform the top surface of said different material to the general contour of facing forming part 14.

Figure 4:
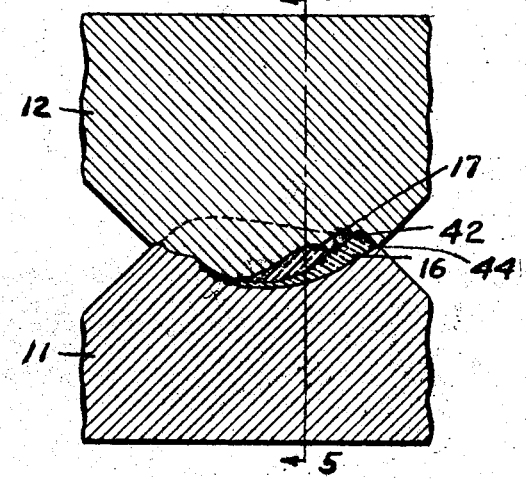
Figure 10:
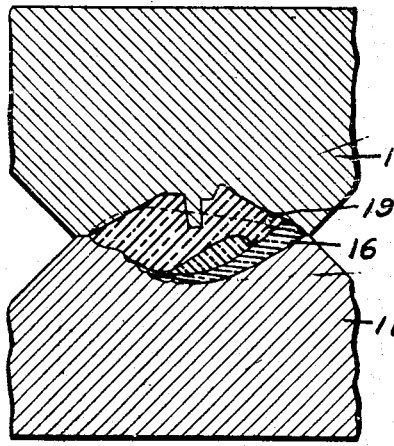

The mould parts 11 and 12 are then assembled as illustrated in Figures 1 and 4, and subjected to heat while under pressure and the facing 16 formed by the mould parts is thus biscuited. The mould part 12 is then removed and the different material placed in the intaglio design formed by the depressions 15 will appear in relief upon the concave lingual side of facing 16. The design appearing in relief is generally indicated at 17. A third mould part 18 adapted to shape the body portion of the tooth has the body forming depressions 19 therein filled with vitreous or resinous forming material and the mould parts 11 and 18 are assembled as indicated in Figure 10. The assembled mould parts are then subjected to a biscuiting operation. The biscuited tooth is then removed, cleaned, and vitrified in the usual manner in the case of porcelain or cure-hardened in the case of plastic.

Figure 11:
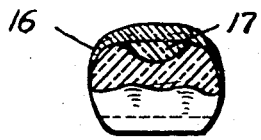
Figure 12:
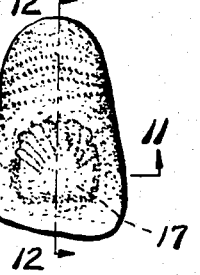
Figure 13:
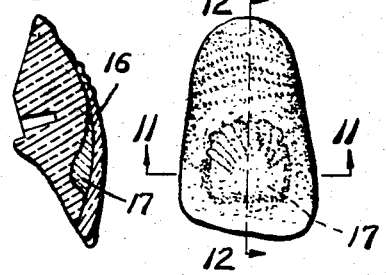

The vitrified or hardened tooth is illustrated in Figures 11, 12 and 13 and the different material embedded in the body material will appear through the relatively translucent facing 16 in the form of spots, streaks and the like conforming to the design 17 formed by shader part 14. It is understood that the different material may be selected to give a lighter or darker color than the body or enamel material in the finished tooth, and that the color effect may be varied for a given different material by altering the depth of the depressions 15. Also, several different materials may be disposed in different depressions 15 to further alter the markings appearing at the labial side of the finished tooth.

Figure 2:
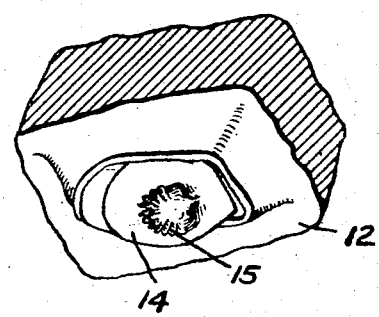
Figure 6:
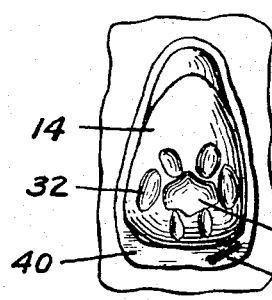
Figure 7:
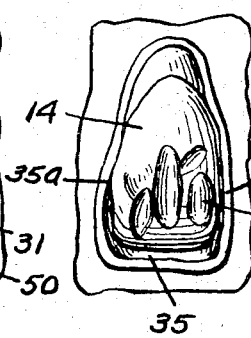
Figure 14:
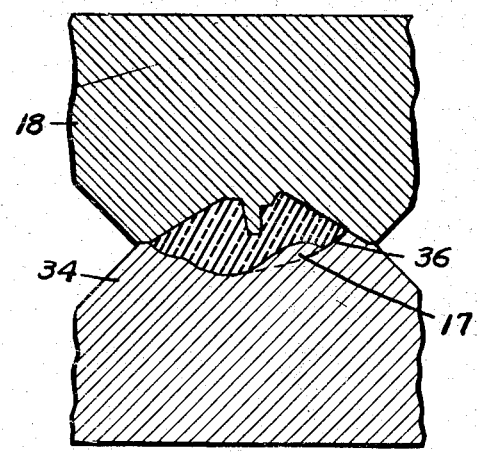
Figure 15:
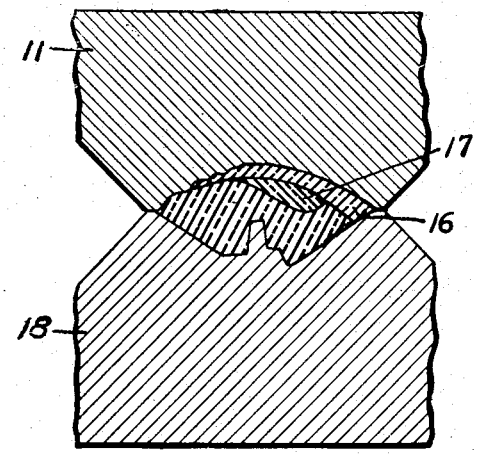

Referring now to Figures 14 and 15, we have shown a modified method of forming the tooth illustrated in Figures 11 to 13 inclusive. In this modification, the shader mould part 34 is provided with a concave depression 36 having the design 17 formed in relief. Body forming material is deposited in depression 36 and the mould parts 18 and 34 are combined and subjected to a biscuiting operation. Mould part 34 is then removed and the design 17 will appear at the exposed labial side of the biscuited body portion in intaglio. The design is then filled with different material to conform to the general contour of the exposed surface of the body portion, and after depositing facing material in mould part 11, the moulds 11 and 18 are combined as illustrated in Figure 15. The combined mould parts are then subjected to heat and pressure to biscuit the tooth, and the tooth is fired in the usual manner. Thus, it will be seen that the resulting tooth is the same, but that in the first instance the facing is first formed, and in the second instance the body portion is first formed. Of course, sufficient facing material may be applied to mould part 11 to fill the intaglio design 17 formed in the body portion rather than applying different material. Figures 6 to 9 inclusive illustrate a variety of designs which may be employed, Figure 8 being an enlarged bottom plan view of the shader mould part of Figure 2. In Figure 6, the facing forming portion 14 is provided with a central depression 31 and a plurality of generally oblong depressions 32. Figures 7 and 9 show a plurality of oblong depressions 33 of variable size and shape. It is understood that the foregoing designs are merely illustrative, and that a variety of designs other than those indicated may be used.

Figure 8:
Figure 9:
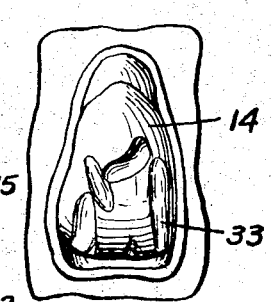
Figure 16:
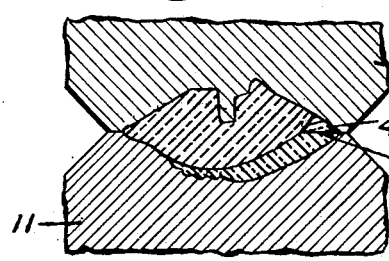

By reference to Figures 4 and 8 it will be noted that a groove 42 is provided at the incisal edge of facing forming part 14, and this groove may have facing material applied thereto so that the facing material at the incisal portion extends above the parting line 44 of the mould, as illustrated in Figure 4. The facing material, as illustrated in Figure 10, projects above the parting line of mould part 11 and into the depression 19 of mould part 18, thereby preventing the body material from extending to the incisal edge of the tooth. If desired, groove 42 may have material different from both the facing material and body material deposited therein so that, as illustrated in Figure 16, the lingual incisal portion of the tooth will comprise material 46 extending in a mesial-distal direction. Thus, in the finished tooth the material 46 will be visible through the relatvely translucent labial incisal portion of the tooth to give a desired marking and color effect at the tooth incisal portion to conform to an elongated mesial-distal marking frequently found in natural teeth. Figure 6 illustrates a shader mould part wherein groove 42 is omitted so that a substantially flat surface 40 extends from the parting line to the incisal termination of the arcuate facing forming part 14. If a shader mould part of this type is used the facing material in mould part 11 will terminate along line 45 at the incisal portion of the facing, and either facing material or different material 46 may be packed into the incisal end of body forming mould part 18. The shader mould part of Figure 6 may be provided with a rib or elevation 50 on surface 40 which will provide a recess in the incisal portion of the facing to receive material of contrasting color.

Figure 7 illustrates a shader mould part wherein a groove 35 extends not only along the incisal termination of facing forming part 14, but extends both mesially and distally towards the gingival end of the tooth to any desired points, such as indicated at 35ª and 35ᵇ. It is understood that groove 35 may be limited to either the mesial or distal side. Thus, contrasting color areas may be provided both along the mesial and distal sides of a finished tooth or selectively at either the mesial or distal side of the tooth in addition to the incisal portion of the tooth.

Figure 19:
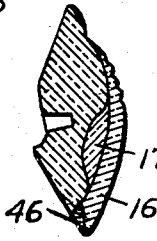

Figure 19 illustrates a completed tooth which may be formed by either of the processes just described. Additional material may be provided to form the design 17 and provide a tooth as illustrated in Figure 19, or such design may be omitted as illustrated in Figure 16.

Figure 17:
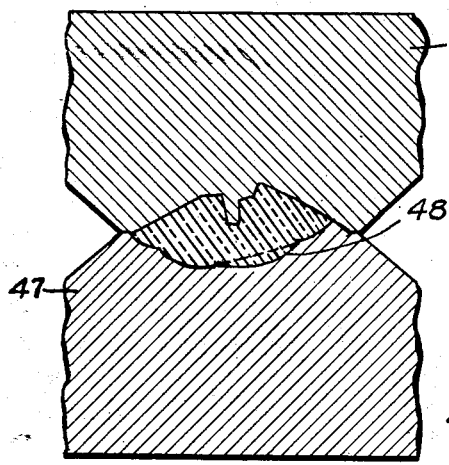

Figure 17 illustrates a shader mould part 47 wherein a design in intaglio indicated at 48 is provided and this design may be filled with different material, or as illustrated, a sufficient amount of body material may be supplied so that when mould parts 47 and 18 are assembled a design in relief of body material will be formed. Facing forming material will then be applied to depression 13 of mould part 11, and when mould parts 11 and 18 are assembled the relief design 48 will provide thinned-out areas in the facing material.

Figure 18:
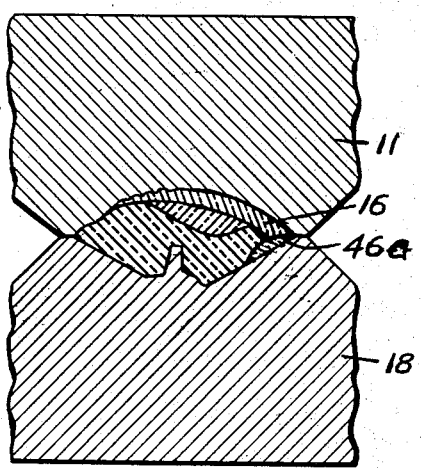

Figure 18 illustrates the manner of forming a tooth generally similar to the tooth illustrated in Figure 19 but wherein material 46ª disposed at the lingual incisal portion of the tooth is extended to a greater extent towards the gingival end of the tooth than the material 46. Thus, the material 46ª overlies a portion of the body material at the lingual side of the tooth, and this material may be packed at the incisal portion of depression 19 in the mould part 18 prior to depositing the body material therein.

Figure 22:
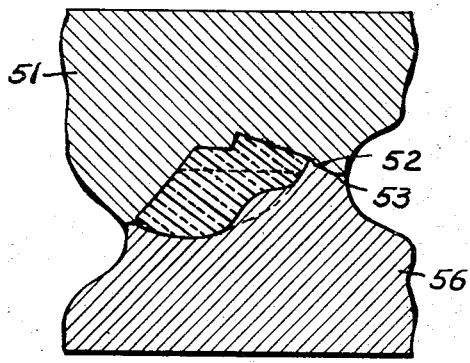
Figure 23:
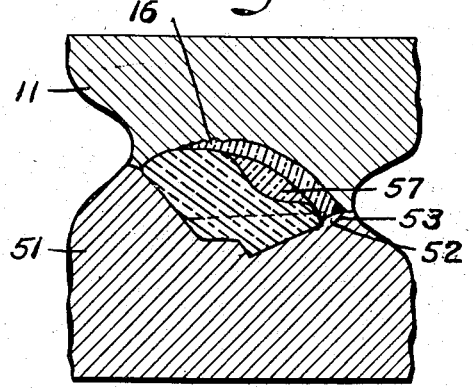

Referring now to Figures 11 and 23, we have shown a body forming mould part 51, and a shader mould part 56 generally similar to mould parts 18 and 34 illustrated in Figure 14, but wherein the body forming mould part 51 is provided with a generally V-shaped depression 52, and the shader mould part 56 has a cooperating V-shaped elevation thereon adapted to seat within depression 52, whereby when the mould parts 51 and 52 are assembled, as illustrated in Figure 22, the body material will be prevented from entering depression 52. Different material 57 may then be applied to the biscuited body material, as previously described, and facing material will be supplied to mould part 11, and the mould parts 11 and 51 will be assembled, as illustrated in Figure 23. The lingual incisal enamel material 16 will then be shaped by edge 53 of mould part 51, and will enter depression 52 so that a slight step-form will be imparted to the lingual side of the translucent enamel extending beyond the body material at the incisal portion of the tooth.

We further contemplate that edge 53 of mould part 51 may be shaped to give any desired contour to the lingual incisal facing material, such as forming a depression or depressions therein and that after the moulded tooth illustrated in Figure 23 is biscuited and removed from the mould such depression may be filled with color material prior to firing the teeth.

Figure 24:
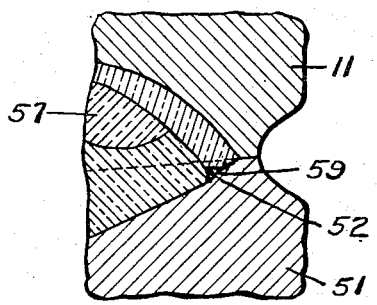

Figure 24 again illustrates the use of the mould parts 11 and 51, but in this instance, the depression 52 is filled with material 59, different in color from the body and enamel material, prior to assembling the mould parts 11 and 51, so that in addition to the step formed at the lingual side of the incisal portion of the tooth, a narrow mesial-distal strip of material different from both the body and facing is disposed at the lingual side of the incisal portion of the tooth. Markings of this type are frequently found in natural teeth, particularly the teeth of older persons.

Figure 20:
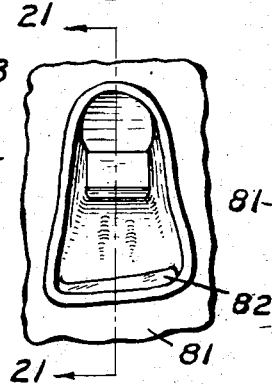
Figure 21:
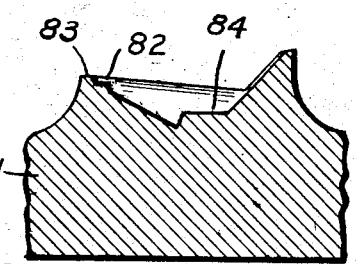
Figure 27:
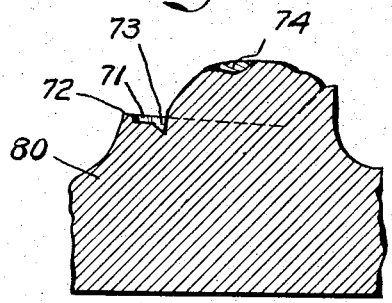
Figure 27 is a longitudinal section of a further modified shader die member we may employ.

Referring now to Figures 20, 21 and 27, we have shown a further modified body forming mould part 81 and shader mould part 80. In this case, the shader mould part may be provided with an intaglio design 74 and a shelf 71 extending from parting line 72 to a generally V-shaped groove 73. The groove 73 may be filled with material different from the body or facing material, and design 74 may have the same or a still different material applied thereto. A small amount of enamel may be deposited on shelf 71, mould part 11 may then have enamel applied thereto, and the mould part 11 may then be assembled with shader mould part 80. After biscuiting and removal of shader mould part 80, the enamel deposited on shelf 71 will extend above or beyond the parting line of mould part 11, together with the different material deposited in groove 73 which will appear in the form of a V-shaped elevation. Mould part 81 is then supplied with body material, and when the mould parts 11 and 81 are assembled the parting line of mould part 11 will abut parting line 83 of mould part 81, and the extended enamel material will rest on shelf 82 of mould part 81. The V-shaped different material will extend into the body forming depression 84 provided in mould part 81, so that the resultant tooth will be of step-form with a mesial-distal stream of different material disposed at the lingual incisal portion of the tooth. This step type mould permits the entire lingual incisal portion of the tooth to be made of a material colored differently from the body or facing, since both groove 73 and step 71 of shader mould part 80 may have the same material applied thereto. Also, one material may be deposited in groove 73 and a different material may be applied to step 71 and each of said materials may be different from both the facing and body material. Thus, with this method the resultant tooth may have the entire lingual incisal portion of a material colored differently from the body material or facing, the entire lingual incisal portion of the tooth may be composed of two differently colored materials extending in a mesial-distal direction, or the different material may be limited to a narrow strip running in a mesial-distal direction at the incisal termination of the body material.

Figure 25:
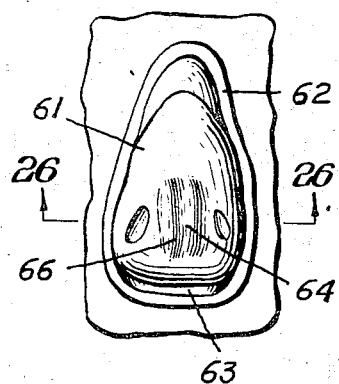
Figure 26:
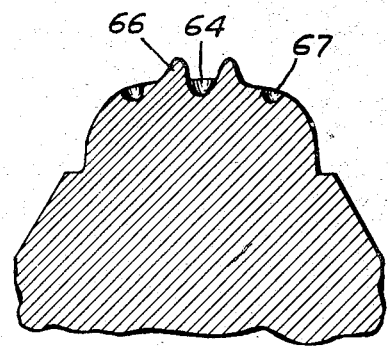
Figure 26 is a section along the line 26—26 of Figure 25.

Referring now to Figures 25 and 26, we have shown a modified form of shader adapted to form the lingual surface of the facing. In this instance, the arcuate or convex surface 61 extends to the draft line 62 of the die at the sides and gingival end, and to a groove 63 at the incisal end. Surface 61 has a central depression 64 therein which may be filled with material either the same or different from the material disposed in groove 63. On each side of depression 64, ridges 66 extend from surface 61, and when the shader is assembled with mould part 11 thinned-out areas will be provided in the facing material disposed in the mould part 11. Additional depressions 67 may be provided and receive material so that a variety of designs in relief will be disposed at the lingual side of the facing together with designs in intaglio or thinned-out areas provided by the ridges 66. Each of the materials disposed in groove 63 and depressions 64 and 67 may be different so that four designs in relief of individually different material will be formed. The body material is then moulded to the facing, and when the tooth is vitrified the body material will appear at the thinned-out areas in the form of streaks or striations. It is understood that the ridges 66 are merely illustrative and that any desired design may be used.

Figure 28:
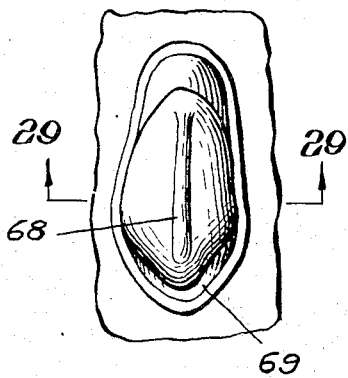
Figure 28 is a fragmentary plan view of a still further modified shader die member we may employ.
Figure 29:
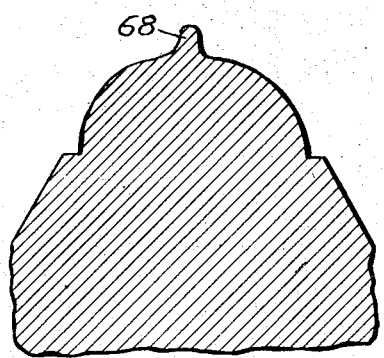
Figure 29 is a section along line 29—29 of Figure 28.

In Figures 28 and 29 a die member is shown which is provided with a single ridge 68, together with a groove 69, and the ridge 68 will provide a thinned-out area in the facing, as previously described.

Figure 30:
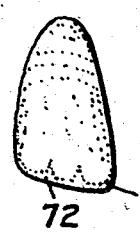
Figure 30 is an elevational view of a finished tooth.

Figure 30 illustrates a finished tooth simulating a natural tooth having lobe formations. Lobe formations are frequently found in natural teeth, particularly the teeth of younger people, due to the dentine blending with the enamel at the incisal portion of the tooth in the form of rounded projections. The artificial tooth illustrated in Figure 30 may be formed by employing the herein described methods and having the body portion terminate incisally in the form of a rounded projection or lobe 71 which will be visible through the translucent incisal enamel 72.

It will now be understood that the various designs described may be formed by applying material different from both the body and facing material, and that the designs may be formed by embedding the different material in the body material, or by embedding the different material in thinned-out areas of the enamel or facing material. Also, the different material may be omitted and the designs may be formed by either embedding facing material in an intaglio design in the body material, or by embedding the body material in an intaglio design in the facing material. We further contemplate that a thin film of decalcomania or stain, which may be of high fusing porcelain stain, may be applied to any of the designs or depressions, such as illustrated in Figures 6 to 9 inclusive, prior to filling these depressions with different material, facing material, or body material. Thus, it will be seen that an unlimited range of color markings, both as to contrasting colors and shape, may be supplied to artificial teeth by the foregoing process wherein three or more mould parts are employed.

The above described process may be employed for forming porcelain teeth or teeth of resinous material, such as acrylic resins, styrene resins and the like.

It will be noted that teeth may be formed with various markings and designs by utilizing different shaders with the same facing forming mould part 11 and the same body forming mould part 18 so that it is only necessary to provide a shader mould part for each new design.

It will now be understood that we have provided a means whereby a multi-part mould may be employed to accurately deposit a vitreous or resinous forming material in pre-selected areas of an artificial tooth and of a given design whereby such different material will appear at the labial side of the finished tooth in the form of streaks, spots, contrasting color areas, and the like. Also, such markings may be effected by employing only relatively translucent facing material and relatively opaque body material, or by applying one or more different materials in addition to the facing and body material. Thus a considerable variety of markings and color effects may be obtained, and at the same time the use of a shader mould part insures a uniformity of manufacture in a tooth of particular structure which could not otherwise be achieved. Further, the material providing the markings in a finished tooth is deposited and formed during the moulding operation, and is deposited in a plastic, liquid or powder-like state.

Although we have shown and described preferred methods and apparatus for practicing our invention we contemplate that numerous and extensive departures may be made therefrom without departing from the spirit of our invention and the scope of the appended claims.

The invention is hereby claimed as follows:

1. The method of forming artificial teeth having markings simulating the markings of natural teeth, which comprises moulding a facing of material adapted to become relatively translucent, and concurrently moulding a design in relief at the lingual side of the facing to thicken an area of the facing, biscuiting the moulded facing and design, moulding the body portion of a material adapted to become relatively opaque to the facing, and then hardening same whereby the thickened area of the facing will be visible labially as a design of contrasting color.

2. The method of forming artificial teeth having markings simulating the markings of natural teeth, which comprises moulding the body portion of the tooth with depressions in the labial surface thereof and from material adapted to become relatively opaque, moulding a facing of material adapted to become relatively translucent to the labial surface of the body portion whereby facing material will be disposed in said depressions and provide thickened areas in the facing, and then hardening same whereby the said thickened areas of the facing will appear labially in contrasting color.

3. The method of providing color markings or designs in artificial teeth of the type having a relatively opaque body portion and a relatively translucent facing portion, said method comprising concurrently moulding the facing and a design in relief at the lingual side of the facing, said design consisting of material different in color from both the body material and facing material, then moulding the body portion and around the different material to the facing portion, and then hardening same whereby the different material will appear through the facing as a design of contrasting color.

4. The method of providing color markings in artificial teeth of the type having a relatively opaque body portion and a relatively translucent facing portion, said method comprising moulding the body portion of the tooth with depressions in the labial surface thereof, filling said depressions with a fire-hardenable material in plastic form different in color from both the body material and facing material, then moulding the facing portion to the body portion, and then hardening same whereby the different material will appear through the facing as designs in contrasting color.

5. The method of providing color markings or designs in artificial teeth of the type having a relatively opaque body portion and a relatively translucent facing portion, which comprises concurrently moulding the facing portion and a design in relief at a pre-selected area of the facing incisal portion, said design consisting of a heat-hardenable material in plastic form different in color from both the facing material and body material, then moulding the body portion to the facing portion and around said design, and then hardening same whereby the design will be visible through the facing incisal portion as a design of contrasting color.

6. The method of providing uniform artificial teeth having color markings by the use of a three-piece mould, said method comprising the steps of employing two mould parts for concurrently forming a facing of material adapted to become translucent when permanently hardened and depositing different material in the form of an elevated design at a predetermined area on the lingual surface of the facing, biscuiting the facing and different material, moulding a body portion of material different in color from the facing material and design material to the facing and around the design material by the use of a third mould part and one of said two mould parts, the body material being adapted to become relatively opaque when permanently hardening same whereby the design will be visible labially through the translucent facing as an area of contrasting color.

7. The method of providing uniform artificial teeth having color markings by the use of a three-piece mould, said method comprising the steps of disposing facing material in a first facing forming mould part, disposing different material in an intaglio design in a cooperating facing forming mould part, assembling the mould parts and applying heat and pressure to concurrently form a biscuited facing and an elevated design of different material on the lingual surface thereof, applying body material to a third mould part, assembling the first and third mould parts and subjecting the mould parts to heat and pressure to form a biscuited tooth with the different material embedded in the body material, and then permanently hardening said tooth whereby the different material will be visible labially through the facing as a design of contrasting color.

8. The method of providing uniform artificial teeth of the type comprising a relatively translucent facing, a relatively opaque body portion, and having color markings visible at the labial aspect of the tooth, said method comprising steps of providing a first mould part adapted to form the labial surface of the facing, a second mould part adapted to form the lingual surface of the facing having a relatively small intaglio design in the forming surface, and a third mould part adapted to form the lingual portion of the tooth, disposing plastic facing material in the first mould part, disposing different material in the design of the second mould part, whereby the dferent material will be substantially flush with the forming surface thereof, assembling the first and second mould parts and applying heat and pressure to concurrently form a biscuited facing and an elevated design of different material on the lingual surface thereof, separating the first and second mould parts, whereby the facing remains in the first mould part, disposing body material in the third mould part, assembling the first and third mould parts and subjecting the mould parts to heat and pressure to form a biscuited tooth with the different material embedded in the body material, then separating the first and third mould parts and removing the biscuited tooth, and then permanently hardening said tooth whereby the different material will be visible labially through the facing as a design of contrasting color.

HENRY M. THORNTON.
CHARLES DIETZ.